United States Patent [19]

Flowers et al.

[11] 4,254,007

[45] Mar. 3, 1981

[54] ELECTRICAL INSULATING COMPOSITION

[75] Inventors: Ralph G. Flowers; William A. Fessler, both of Pittsfield, Mass.

[73] Assignee: General Electric Company, N.Y.

[21] Appl. No.: 75,077

[22] Filed: Sep. 13, 1979

[51] Int. Cl.$^3$ ............................................. C08L 29/04
[52] U.S. Cl. ...................... 260/33.4 P; 260/33.6 UA; 525/58
[58] Field of Search ...................... 525/58; 260/33.4 P, 260/33.6 UA

[56] References Cited

U.S. PATENT DOCUMENTS

| | | | |
|---|---|---|---|
| 2,917,416 | 12/1959 | Lavin | 525/58 |
| 2,917,483 | 12/1959 | Lavin | 525/58 |
| 3,141,005 | 7/1964 | Noll | 525/58 |
| 3,442,834 | 5/1969 | Flowers | 525/58 |
| 3,471,589 | 10/1969 | Rinehart | 525/58 |
| 3,617,969 | 11/1971 | Heinrichs | 525/58 |

FOREIGN PATENT DOCUMENTS

| | | | |
|---|---|---|---|
| 1065118 | 9/1959 | Fed. Rep. of Germany | 525/58 |
| 49-414627 | 11/1974 | Japan | 525/58 |

*Primary Examiner*—Paul Lieberman
*Attorney, Agent, or Firm*—Richard A. Menelly; Francis X. Doyle

[57] ABSTRACT

An electrically insulating wire coating material comprised of the heat cured product of a mixture of polyvinylacetal and phenol-aldehyde resins, or a mixture of these resins with epoxy resins, and a catalyst from the special metal containing group of cyclic organic compounds known as chelates and which can be further defined as being a non-ionic inner complex salt. These materials give insulating coatings with improved flexibility and thermal aging properties.

13 Claims, 3 Drawing Figures

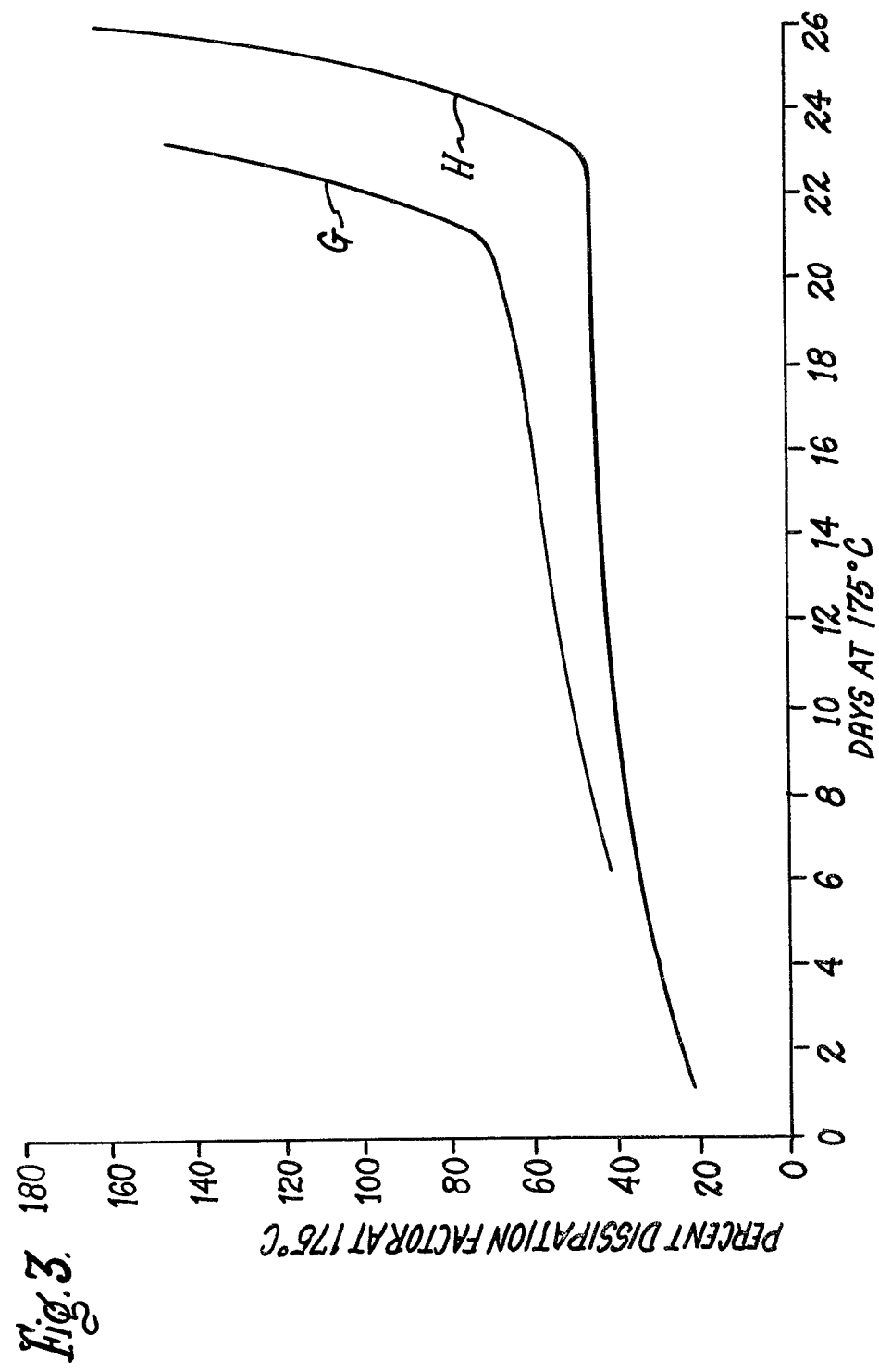

ELECTRICAL INSULATING COMPOSITION

BACKGROUND OF THE INVENTION

The operating life of electrical equipment such as transformers depends to a large extent upon the dielectric properties of the transformer wire insulation. When the coating ceases to provide sufficient insulation between the turns of the transformer coil, electrical breakdown can occur between the turns causing the transformer to fail. Long term dielectric failure can be caused by the hydrolysis of the wire insulation at the temperatures incurred during transformer operation. The primary source of water contributing to the hydrolysis reaction is the thermal degradation of the cellulosic composition of the transformer winding insulation paper.

Besides having good thermal aging properties, the insulated wire must be tough and sufficiently flexible to be wound into a transformer coil without cracking in order to maintain its insulating properties. Transformer wire insulation such as those described within U.S. patent applications Ser. Nos. 889,889, and 970,249 are continuously being subjected to improvements in order to obtain better electrical, physical and thermal properties.

In order to provide insulating coating systems which have improved properties, a plurality of different types of catalysts were employed to cure the polyvinyl acetal, phenolic and epoxy resins within the coating composition. The investigation of the effects of various catalysts upon the coated transformer wire properties showed that the catalysts affect the thermal stability of the coated transformer wire when subjected to accelerated thermal aging tests.

The purpose of this disclosure is to provide a wire coating enamel composition having a preferred catalyst for promoting good flexibility and improved hydrolytic stability.

SUMMARY OF THE INVENTION

The invention comprises transformer wire coating compositions containing polyvinyl acetal and phenolic resins either as a two component composition, or as a three component composition containing epoxy resin, which are cured by means of an inner complex salt catalyst. In one embodiment of the invention, the inner complex salt consists of a bidentate chelating agent having one acid and one coordinating group with metals having coordination numbers which are exactly twice their principle valence. Examples of inner complexes which proved effective are acetylacetonates and glycinates.

BRIEF DESCRIPTION OF THE DRAWINGS

FIG. 3 is a graphic representation of the dissipation factor as a function of time for wire coating compositions catalyzed by zinc octoate and aluminum acetylacetonate.

DESCRIPTION OF THE PREFERRED EMBODIMENT

In order to provide transformer wire insulating enamel coatings having good flexibility and improved thermal aging properties the following compositions were prepared:

EXAMPLE 1

17 Parts of weight of polyvinylacetal resin was mixed with 8.5 parts of phenolic resin and 0.5 parts of aluminum acetylacetonate catalyst in a solvent consisting of 24.2 parts xylene, 24.2 parts of hydrocarbon, and 51.2 parts cresol. Resin films were cast from their composition and were evaluated for flexibility and electrical properties.

The dissipation factor at 170° C. for the cured wire coating of Example 1 measured from 8 to 10% initially. The percent solids by weight of the enamel was 21%.

EXAMPLE 2

A wire coating enamel having a higher 23.5% solids content was prepared in a manner similar to Example 1 and was evaluated for flexibility and electrical properties. The coating had good flexibility and the dissipation factor of the coating was equal to that of the coating described in Example 1.

EXAMPLE 3

100 Parts of a 23.5% solids polyvinylacetal-phenolic enamel was treated with 0.8 parts aluminum acetylacetonate and 0.7 parts hexamethoxymethylmelamine. This enamel was applied to 0.0403 Cu wire and the finished product had excellent flexibility and electrical properties. The resulting enamel was also evaluated for thermal aging by measuring the dissipation factor initially at 175° C., and determining the dissipation factor at 175° C. as a function of time. For purposes of this disclosure, the "dissipation factor" is defined as one measurement of the electrical losses occurring in the coating. The dissipation factor measurement is obtained by submerging the coated wire with a layer of insulating paper within a container of heated transformer oil. The electrical properties of the wire are continuously monitored relative to a standard over a period of time. The dissipation factor at 175° C. over a period of time in days is an indication of how the transformer wire would operate within a transformer at the lower temperature in the transformer oil over a period of years.

Figure 1:
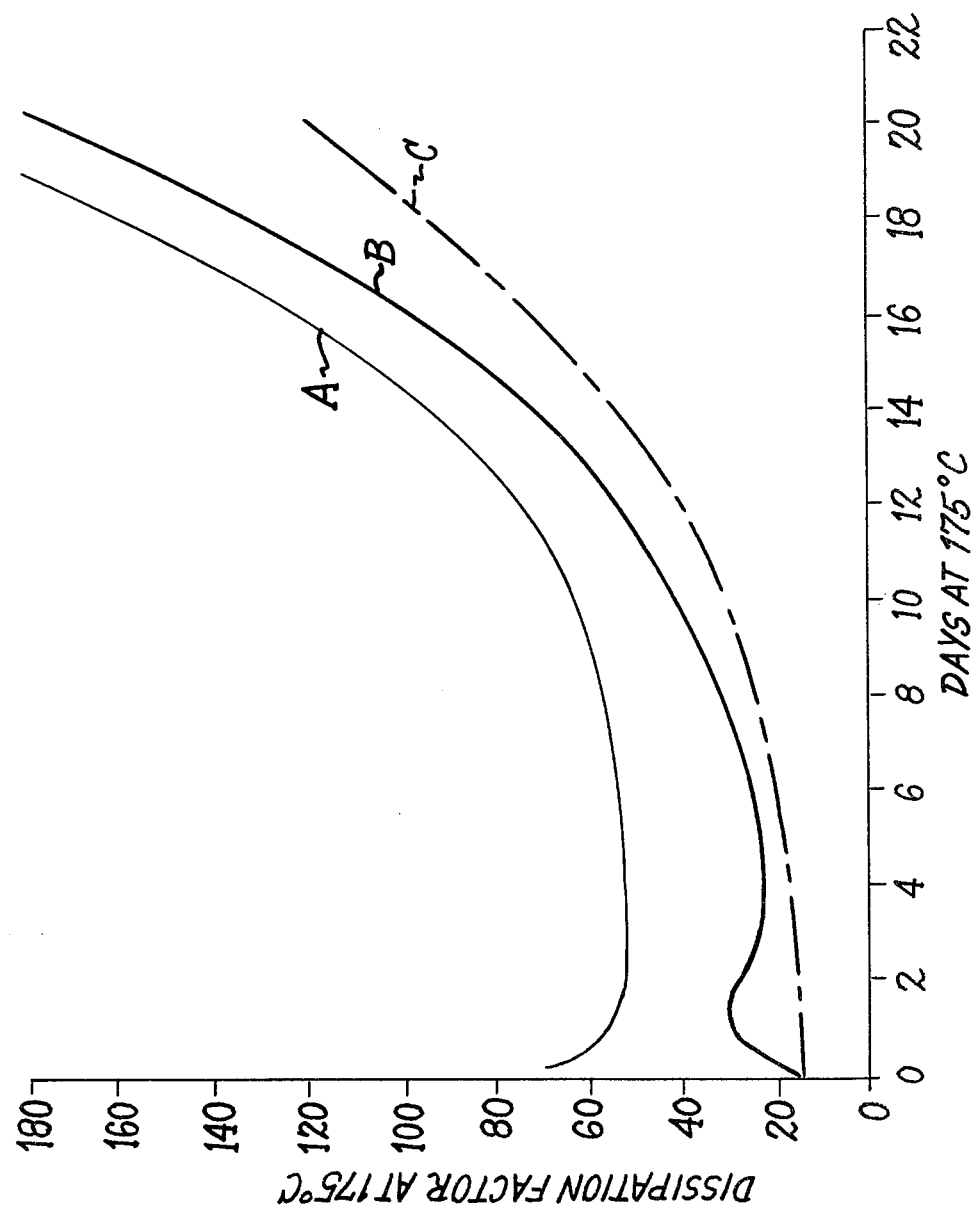
FIG. 1 is a graphic representation of the dissipation factor as a function of time for a plurality of wire coating formulations.

FIG. 1 shows the comparative thermal aging values of a standard polyvinylacetal-phenolic coating at Curve A; a coating from a polyvinylacetal-phenolic enamel which had been treated with zinc octoate and hexamethoxymethylmelamine at Curve B; and a coating from example 3 where the zinc octoate was replaced by the non-ionic inner complex salt, aluminum acetylacetonate at Curve C.

EXAMPLE 4

A wire coating enamel was prepared by dissolving 452 parts of weight polyvinylacetal, 226 parts of a phenolic resin, 18.9 parts hexamethoxymethylmelamine and 19.8 parts zinc acetylacetonate catalyst in a solvent containing 490 parts xylene, 798 parts of a hydrocarbon and 1262 parts cresol. The coating exhibited excellent flexibility and had a dissipation factor of 7% at 170° C. The solids content was 22% by weight.

EXAMPLE 5

452 Parts polyvinylacetal, 226 parts of a phenolic resin, 18.9 parts hexamethoxymethylmelamine and 19.3 parts nickel acetylacetonate catalyst, were dissolved in a solvent containing 490 parts xylene, 798 parts of a hydrocarbon, and 1262 parts cresol. The coating exhibited excellent flexibility and the dissipation factor of the coating was 7% at 170° C.

EXAMPLE 6

A wire coating enamel similar to Example 4 was prepared using copper glycinate catalyst in place of the zinc acetylacetonate. The resultant coating exhibited excellent flexbility and the dissipation factor of the coating was low.

EXAMPLE 7

A wire coating enamel similar to Example 5 was prepared with nickel dimethylglyoxime substituted for nickel acetylacetonate as a catalyst. The resulting coating had excellent flexibility and exhibited a dissaption factor of 14% at 170° C.

EXAMPLE 8

A wire coating enamel was prepared by mixing 4.7 parts polyvinylacetal, 3.1 parts phenolic, 2.0 parts epoxy resin and 0.18 parts aluminum acetylacetonate in a solvent containing 10 parts xylene and 30 parts cresol. The aluminum acetylacetonate comprised 1.9% by weight of the resins. Coatings from this composition exhibited excellent flexibility and dissipation factors below 20% at 170° C.

EXAMPLE 9

A wire coating enamel metal was prepared from the composition given in Example 8 with the following parts by weight of aluminum acetylacetonate catalyst: 0.015, 0.03, 0.06, and 0.10. These correspond to 0.15, 0.31, 0.61 and 1.02 percent by weight of the resins, respectively. Good flexibility and low dissipation factors occurred throughout the entire range of catalyst concentration.

EXAMPLE 10

A wire coating enamel was prepared containing the composition given in Example 8 substituting 0.08 parts of titanium acetylacetonate for aluminum acetylacetonate. Coatings prepared from this composition exhibited excellent flexibility and low dissipation factors.

EXAMPLE 11

An insulating coating with excellent physical and electrical properties was obtained by curing a film applied to the wire from an enamel prepared from 731 parts of a polyvinylacetal-phenolic resin containing approximately 50 parts of a blocked polyisocyanate, 290 parts epoxy resins and 5.2 parts aluminum acetylacetonate. These materials were dissolved in 1650 parts of a cresylic solvent and 550 parts of a hydrocarbon solvent to give an enamel of 26% solids.

EXAMPLE 12

Excellent coatings were prepared from an enamel similar to Example 11, but with 14.6 parts of aluminum acetylacetonate.

Figure 2:
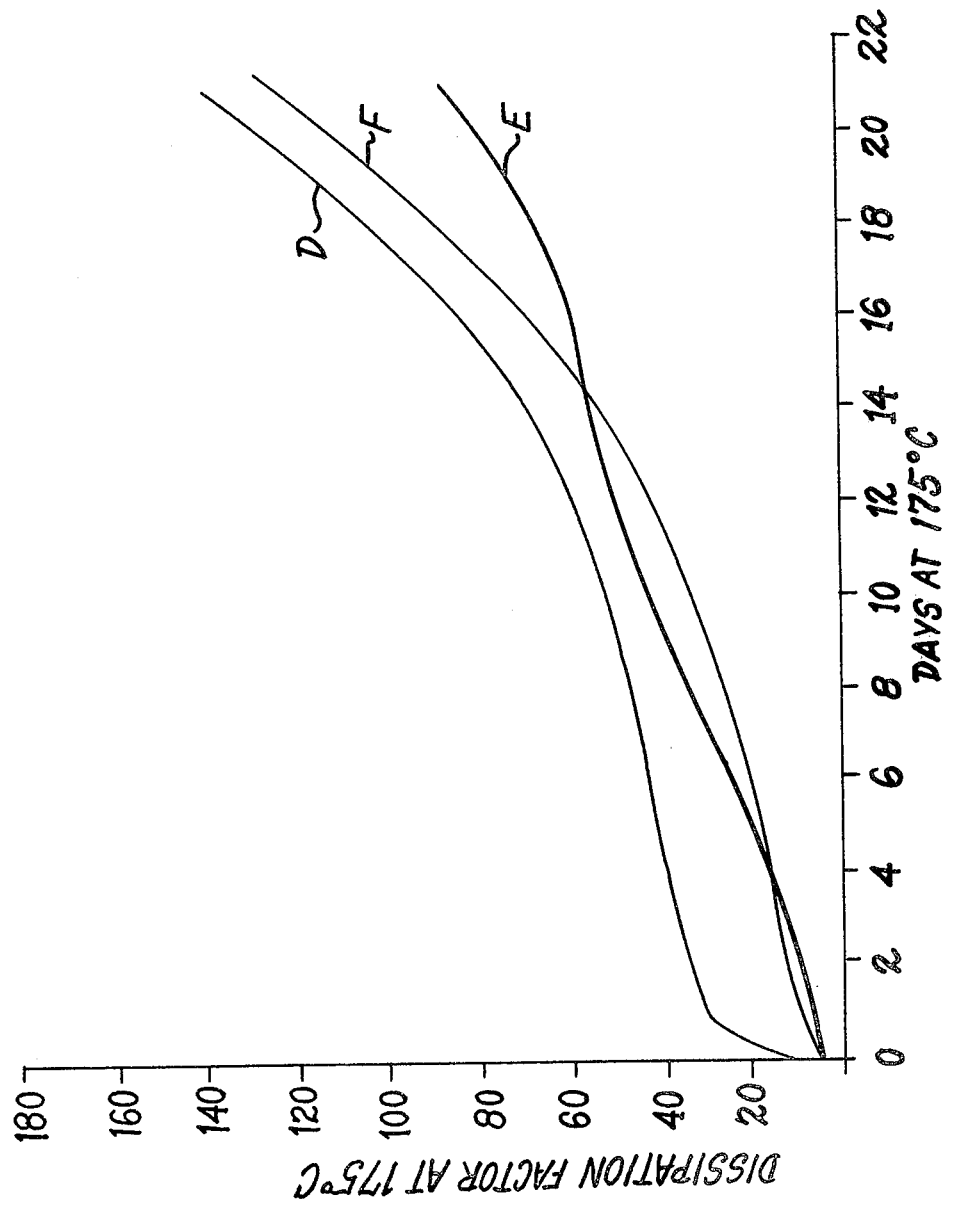
FIG. 2 is a graphic representation of the dissipation factor as a function of time comparing wire coatings catalyzed with zinc octoate to wire coating catalyzed with nickel acetylacetonate and zinc acetylacetonate.

The dissipation factor for wire coated with the enamel given in Example 5 employing the non-ionic inner complex salt nickel acetylacetonate as a catalyst is shown at D in FIG. 2 for comparison with the same enamel composition containing the ionic salt zinc octoate catalyst at F and the enamel composition from Example 3 containing the non-ionic inner complex salt zinc acetylacetonate catalyst at E.

FIG. 2 shows that the zinc octoate catalyst has a lower dissipation factor than the nickel acetylacetonate but a higher dissipation factor than the zinc acetylacetonate. FIG. 2 shows further that not only do the inner complex salts affect hydrolytic stability, but also that the particular metal that comprises that salt may also have an effect.

In order to determine whether the lower dissipation factor resulting from the use of the non-ionic inner complex salt catalysts occurs with three component wire enamels containing epoxy, a control composition similar to Example 11 was prepared using the metal organic salt, zinc octoate, for comparison to the non-ionic aluminum acetylacetonate used in Example 11. The results are shown in FIG. 3 with the dissipation factor for the enamel composition catalyzed with zinc octoate shown at G, substantially higher than the same composition catalyzed with aluminum acetylacetonate shown at H.

The improvement in thermal aging and the anticipated extended transformer life by the use of inner complex salts catalysts, in place of metal organic salts in wire coating enamels, is not well understood at this time. It is postulated however, that the catalyst for the enamel resins may remain as an impurity in the coating after the curing process is completed. The inner complex salts, which are non-ionic, whould be less likely to react with moisture to ionize and interfere with the dielectric properties of the coating than the metal organic salts which readily form ions in solution with water.

Although the use of a non-ionic inner complex salt is disclosed as a catalyst for transformer wire insulating enamels, this is by way of example only. The coatings of the instant invention find application wherever insulating enamels may be utilized.

What is claimed as new and which it is desired to secure by Letters Patent of the United States is:

1. An electrically insulating wire coating enamel consisting essentially of a mixture of polyvinylacetal resin and phenolic resin and including from 0.15 to 1.9 percent by weight of an inner complex salt which comprises a bidentate chelating agent having one acid and one coordinating group wherein the chelating agent includes a metal having a coordination number equal to twice the principle valence of the metal.

2. The wire coating enamel of claim 1 wherein the inner complex of salt is selected from the group consisting of acetylacetonates and glycinates.

3. The wire coating enamel of claim 2 wherein the metal is selected from the group consisting of nickel, aluminum and zinc.

4. The wire coating enamel of claim 1 wherein the catalyst is selected from the group consisting of aluminum, nickel, titanium and zinc acetylacetonates.

5. The wire coating enamel of claim 1 wherein the catalyst comprises cooper glycinate.

6. The wire coating enamel of claim 1 wherein the catalyst comprises nickel dimethylglyoxime.

7. The wire coating enamel composition of claim 1 further including an epoxy resin.

8. A method of preparing wire coating enamels comprising the steps of:

dissolving a mixture of polyvinylacetal resin, phenolic resin in a solvent, with from 0.15 percent to 1.9 percent of said resins of an inner complex salt which comprises a bidentate chelating agent having one acid and one coordinating group wherein the chelating agent includes a metal having a coordination number equal to twice the principle valence of the metal.

9. A method of preparing a wire coating enamel comprising the steps of:

dissolving 452 parts polyvinylacetal resin 226 parts of phenolic resin, 18.9 parts hexamethoxymethylmelamine and 19.8 parts zinc acetylacetonate in a solvent mixture consisting of xylene and cresol.

10. A method of preparing insulating wire coating enamels comprising the steps of dissolving 452 parts polyvinylacetal resin, 226 parts phenolic resin, 18.9 parts hexamethoxymethylmelamine and 19.3 parts nickel acetylacetonate in a solvent mixture of xylene and cresol.

11. A method of preparing insulating wire coating enamels comprising the steps of:

dissolving 4.7 parts polyvinylacetal resin, 3.1 parts phenolic resin, 2.0 parts epoxy resin and from 0.01 to 0.18 parts of metal acetylacetonate in a solvent mixture of xylene and cresol.

12. A method of preparing insulating wire coating enamels comprising the steps of:

dissolving 4.7 parts polyvinylacetal resin, 3.1 parts phenolic resin, 2.0 parts epoxy resin and 0.08 parts titanium acetylacetonate in a solvent mixture of xylene and cresol.

13. The method of claim 11 wherein the xylene comprises 10 parts and the cresol comprises 30 parts.

* * * * *